United States Patent [19]

Hein et al.

[11] 4,116,844
[45] Sep. 26, 1978

[54] COMPENSATING PLATE FOR A PRESSURE FILTRATION CELL

[75] Inventors: Wolfgang Hein; Claus Cosack, both of Dassel; Peter Grundmann, Konigswinter, all of Fed. Rep. of Germany

[73] Assignee: Carl Schleicher & Schull, Einbeck, Fed. Rep. of Germany

[21] Appl. No.: 817,927

[22] Filed: Jul. 22, 1977

[30] Foreign Application Priority Data

Dec. 16, 1976 [DE] Fed. Rep. of Germany ....... 2657031

[51] Int. Cl.² .......................................... B01D 29/00
[52] U.S. Cl. .................................. 210/446; 210/455; 210/477
[58] Field of Search ............ 210/435, 446, 447, 450, 210/477, 479, 481, 483, 484, 455

[56] References Cited

U.S. PATENT DOCUMENTS

| | | | |
|---|---|---|---|
| 3,010,583 | 11/1961 | Kenyon | 210/446 X |
| 3,764,017 | 10/1973 | Dover | 210/481 |
| 3,882,024 | 5/1975 | Holmes et al. | 210/450 X |

FOREIGN PATENT DOCUMENTS 958,467  2/1957  Fed. Rep. of Germany .......... 210/446

*Primary Examiner*—William A. Chuchlinski, Jr.
*Attorney, Agent, or Firm*—Webb, Burden, Robinson & Webb

[57] ABSTRACT

A compensating plate for a pressure filtration cell including a generally cylindrical liquid-feeding vessel and a base removably connected to the feeding vessel by means of a flanged joint, the removable base forming a filter holder, in which an outer edge of the plate is engaged in a flange between the liquid-feeding vessel and the filter holder and, on its upper side, the outer edge of the plate is sealed against the liquid-feeding vessel by means of a circumferential seal. The compensating plate has a central opening corresponding to the size of a filter placed in the filter holder, the plate having a slight conical depression toward the said opening. The opening passes into a downwardly extending cylindrical frame whose bottom edge presses the filter or a filter packing against the filter holder in a sealing manner when the filter holder and the liquid-feeding vessel are forced axially toward one another such that the compensating plate functions as a seal between the liquid-feeding vessel and the filter holder formed by the removable base.

7 Claims, 1 Drawing Figure

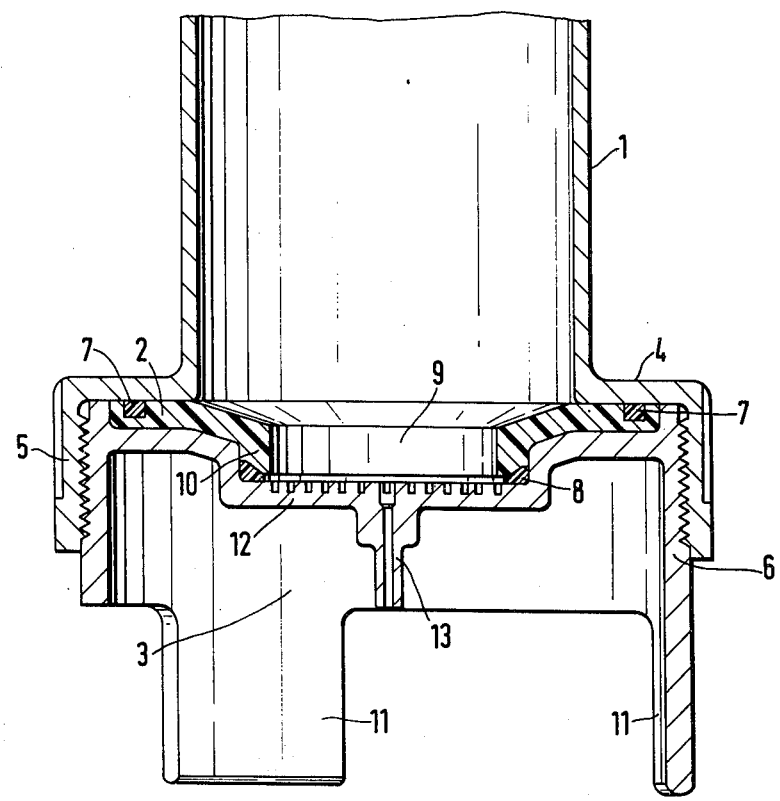

COMPENSATING PLATE FOR A PRESSURE FILTRATION CELL

FIELD OF THE INVENTION

This invention relates to pressure filtration apparatus and particularly to a compensating plate for a pressure filtration cell of the type having a basically cylindrical liquid-feeding vessel and a removable base connected thereto by means of a flanged joint.

BACKGROUND OF THE INVENTION

Heretofore, usual cells of this type comprise basically cylindrical vessels having a removable base which is designed as or forms a filter holder. The base is imperviously connected to the liquid-feeding vessel by means of a gasket or some form of circumferential seal, usually under suitable pre-stress. In such devices, the available filtration surface corresponds practically to the radial cross section of the pressure filtration cell. In order to achieve optimum filtration, special balanced relationships are coordinated and established between the filtration surface, the volume of liquid, i.e., the height of the cylindrical feeding vessel, and the maximum operational pressure. However, such coordination completely disregards both the purpose of the filtration to be carried out, as well as the nature and concentration of the liquid which is to be filtered.

For two completely identical media that are to be filtered, a smaller filtering surface will be selected if the residue is to be processed, and a larger filtering surface will be selected, if the filtrate alone is to be processed. Similarly, if the residue is to be collected, analyzed, and/or processed for two otherwise identical solutions, a larger filtering surface will be selected for a more concentrated solution, while a smaller filtering surface will be selected for a more dilute solution. The usual pressure filtration cells cannot fundamentally do justice to these demands, since their filtration surfaces are essentially always equal to the radial cross section of the feeding vessels. After these facts have been established, the only remaining variable is the height of the feeding vessel. When there is a great volume to be filtered, this forces one either to use unwieldy high vessels or to fill up the pressure filtration cell more frequently, which as a rule results in cumbersome handling.

In view of this existing state of technological development, it is the aim of the invention to create a pressure filtration cell in which the filtering surface is independent of the dimensions of the cell.

SUMMARY OF THE INVENTION

In order to solve this problem, a compensating plate for a pressure filtration cell is proposed which exhibits the characteristics of the invention as set forth in the claims.

The compensating plate is preferably made of a synthetic, e.g. plastic, material. It serves simultaneously as a sealing element between the filter holder and the liquid-feeding vessel and as a tensioning element for the filter packings.

The seal between the compensating plate and the feeding vessel or between the compensating plate and the filter holder is preferably effected by gaskets of an elastic sealing material, but it may also be effected in any other desired way. Moreover, the compensating plate and the plate of the filter holder may be coordinated with one another in corresponding profiles, but it is also possible to design the filter holder plate as a planar plate with different concentric annular webs which make it possible to use compensating plates with central openings of various sizes for one and the same filter holder plate. When using profiles that are coordinated with one another between the compensating plate and the filter holder plate, the filter holder plate must also be exchanged when the compensating plate is changed.

The base, which is designed as a filter holder plate and preferably also as a support, such as a tripod, is preferably connected to the liquid-feeding vessel by way of a threaded connection designed as a flange wherein internal threads are formed in a downwardly extending frame on the flange of the feeding vessel similar to a capscrew.

The compensating plate of the invention permits filtration with freely selectable filtrating surfaces from one and the same pressure filtration cell. Consequently, it is not only possible for any kind of filtration to regulate conditions that are geometrically coordinated with one another, but it is also possible to take into consideration the particular properties and characteristics of the medium that is to be filtered, while optimizing the filtration conditions.

BRIEF DESCRIPTION OF THE DRAWING

In the following specification, the invention will be more fully described with the aid of an exemplifying embodiment in connection with the drawing. The single FIGURE of the drawing is an axial section of an exemplifying embodiment of the invention in which the base forming the filter holder is at the same time designed as a tripod support for the pressure filtration apparatus.

DESCRIPTION OF A PREFERRED EMBODIMENT OF THE INVENTION

The device shown in the figure comprises basically the partially shown liquid-feeding vessel 1, the compensating plate 2, and the filter holder 3 designed as a tripod support and base. At its bottom edge, liquid-feeding vessel 1 is provided with a flange 4 and a frame 5 extending downwardly at the radial outer edge of the flange, the said frame having internal threads.

A downwardly directed frame 6 extending around the outer edge of the filter holder is provided with external threads which can be threaded into the internal threads of frame 5. As the result of this screw-mechanism, liquid-feeding vessel 1 and filter holder 3 are axially pre-stressed against one another. The radial axial edge of filter holder 3 is likewise designed as a flange and namely in such a way that it can cooperate with the flange 4 of the feeding vessel.

Compensating plate 2 is provided with two gaskets or it is so designed that it can produce two circumferential seals. An upper gasket 7 is preferably positioned in a annular groove running around the periphery of the compensating disk and seals off the gap between the compensating disk and flange 4. A lower gasket 8 is positioned at or on the lower edge of frame 10 which forms the downward continuation of a central opening 9 of compensating plate 2. In this connection the greatest possible threading depth of the filter holder into the flanged frame of the feeding vessel is so selected that the compensating plate, which preferably possesses a certain springiness, is resiliently and sealingly clamped between feeding vessel 1 and compensating plate 2.

In the exemplifying embodiment shown in the figure, the base or filter holder 3 of the pressure filtration cell is simultaneously designed as a tripod support for the filtration cell. Support legs 11 are used for this purpose. The discharge from filter holder plate 12 runs off by way of a discharge nipple 13 to which either a run-off hose or some other catch basin may be connected.

The great advantage of the device is to be found in the fact that one and the same pressure filtration cell may be operated with filters or readily available filtration surfaces of various sizes.

Having described presently preferred embodiments of this invention, it is to be understood that it may be otherwise embodied within the scope of the appended claims.

We claim:

1. A compensating plate for a pressure filtration cell including a substantially cylindrical feeding vessel and a removable base therefor which forms a filter holder, said base adapted to be connected to the vessel by means of a flanged joint, the plate having an outer edge for engagement in a flange between the vessel and the filter holder such that on its upper side, the compensating plate is sealed against the vessel by way of a circumferential seal, the plate having a central opening corresponding to the size of the filter to be used and having a slight conical depression toward the said opening, the opening designed to pass into a downwardly extending cylindrical frame whose bottom edge is adapted to press the filter against the filter holder in a sealing manner when the filter holder and the vessel are forced axially toward one another, so that the compensating plate functions as a seal between the vessel and the filter holder.

2. In a pressure filtration cell including a substantially cylindrical vessel and a removable base therefor which forms a filter holder, said base being connected to the vessel by means of a flanged joint, a compensating plate having an outer edge in engagement in a flange between the vessel and the filter holder and, on its upper side, the compensating plate is sealed against the vessel by way of a circumferential seal, the plate having a central opening corresponding to the size of the filter used and having a slight conical depression toward said opening, the opening passing into a downwardly extending cylindrical frame whose bottom edge presses the filter against the filter holder in a sealing manner when the filter holder and the vessel are forced axially toward one another, so that the compensating plate functions as a seal between the vessel and the filter holder.

3. The pressure filtration cell as set forth in claim 2 wherein the compensating plate comprises resilient, synthetic material.

4. The pressure filtration cell as set forth in claim 2 wherein the base also forms a support for said cell.

5. The pressure filtration cell as set forth in claim 2 wherein the base is connected to the vessel by means of a threaded connection between internal threads formed in the downwardly extending cylindrical frame on the flange of the feeding vessel and external threads formed on the downwardly extending frame of the filter holder, whereby the filter holder and the vessel may be forced axially toward one another by tightening the threaded connection.

6. The pressure filtration cell as set forth in claim 2 wherein a groove extends around the periphery of the upper side of the compensating plate adjacent its outer edge and a gasket is disposed in said groove providing a circumferential seal between the vessel and the filter holder.

7. The pressure filtration cell as set forth in claim 6 and including a gasket positioned ajdacent the lower edge, the downwardly extending frame into which the central opening of the plate passes between said lower edge and the filter holder providing a second circumferential seal.

* * * * *